United States Patent [19]
Boardman

[11] 3,814,185
[45] June 4, 1974

[54] METHOD FOR INTERCONNECTING NUCLEAR CHIMNEYS

[75] Inventor: Charles Robert Boardman, Las Vegas, Nev.

[73] Assignee: The United States of America as represented by the United States Atomic Energy Commission, Washington, D.C.

[22] Filed: Feb. 27, 1973

[21] Appl. No.: 336,304

[52] U.S. Cl. .............................................. 166/247
[51] Int. Cl. ........................................... E21b 43/26
[58] Field of Search ...................... 166/247; 102/23

[56] References Cited
UNITED STATES PATENTS

| | | | |
|---|---|---|---|
| 3,303,881 | 2/1967 | Dixon | 166/247 |
| 3,688,843 | 9/1972 | Nordyke | 166/247 |
| 3,707,188 | 12/1972 | Heckman | 166/247 |
| 3,712,374 | 1/1973 | Terhune | 166/247 |
| 3,714,895 | 2/1973 | Bawson | 166/247 |

Primary Examiner—James A. Leppink
Attorney, Agent, or Firm—Hohn A. Horan; John A. Koch

[57] ABSTRACT

A method of preparing a subterranean formation for the detonation of a plurality of nuclear explosives. Vertical intervals between adjacent, vertically spaced apart nuclear explosive shot points are prefractured by nonnuclear means prior to detonation of the nuclear explosives to assure interconnection of fractures between the two resulting chimneys.

7 Claims, 1 Drawing Figure

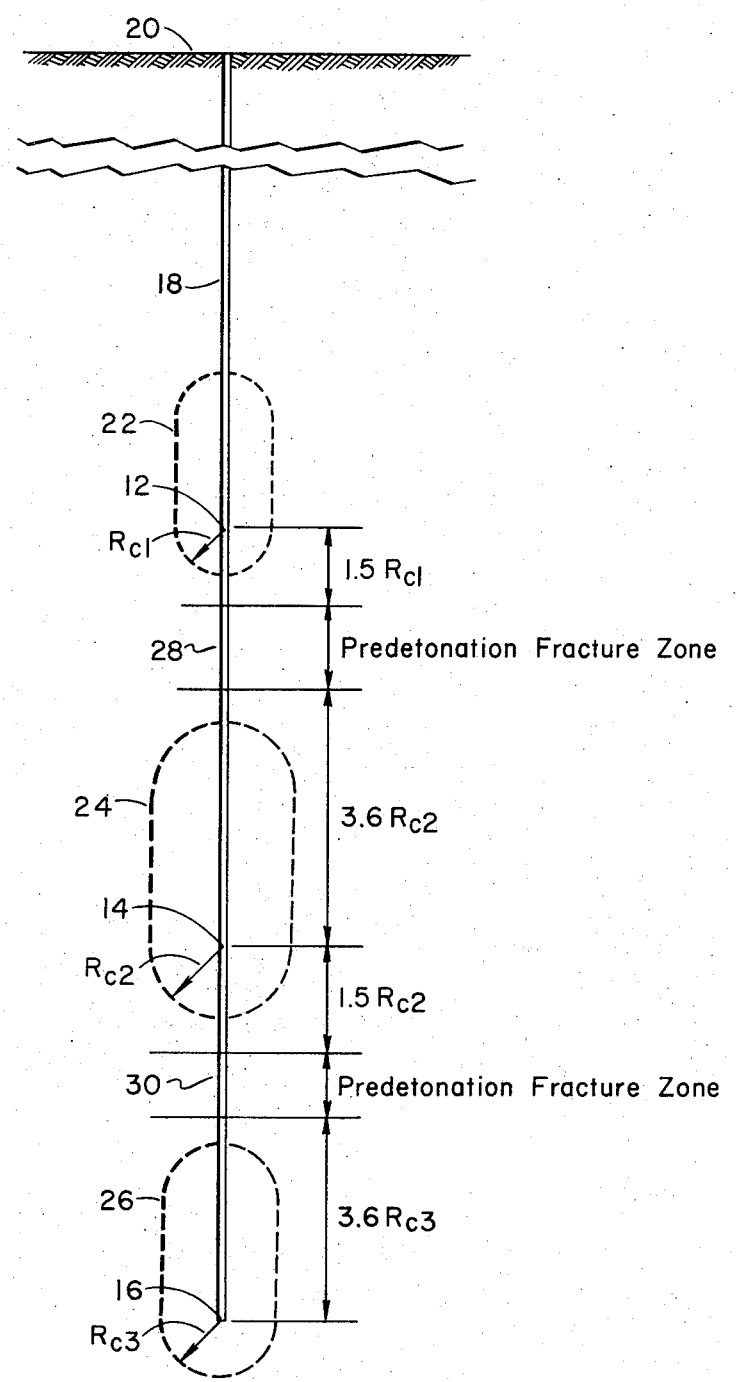

METHOD FOR INTERCONNECTING NUCLEAR CHIMNEYS

BACKGROUND OF THE INVENTION

The invention described herein was made in the course of or under Contract No. AT(26-1)-429 with the Atomic Energy Commission.

This invention relates to the use of nuclear explosives in the production of natural resources from subterranean formations. More particularly, this invention relates to the use of a plurality of nuclear explosives and to their deployment in a manner which enhances their effectiveness.

The use of nuclear explosives to facilitate, increase and/or stimulate the production and/or utilization of resources such as minerals, geothermal energy, etc., from naturally occurring underground deposits or reservoirs has been the subject of much scientific and technical interest. The sequence of events and resultant changes to an underground formation following the detonation of a nuclear device which has been deeply buried underground, including the formation of a cavity, the collapse of the cavity roof leading to the formation of a chimney and the fracturing of the formation surrounding the chimney, are now well understood. Many ideas have been advanced on ways to use the massive rubble formation of the chimney and the fractures in the formation surrounding the chimney to facilitate the recovery or development of resources which heretofore has not been economically feasible by non-nuclear means.

Two natural gas stimulation projects, i.e., Project Gasbuggy and Project Rulison, have demonstrated that the production of natural gas from relatively impermeable or so called "tight" formations can be greatly increased by the use of nuclear explosives. The chimney and the associated fractures in the formation radiating outwardly from the chimney had the effect of significantly increasing the effective well-bore diameter. Projects Gasbuggy and Rulison each involved the detonation of a single nuclear explosive. The yield of the nuclear explosive for Project Gasbuggy was selected so that the resulting chimney and associated fractures would traverse essentially the entire gas bearing formation in the vertical direction. In Project Rulison, however, the single nuclear explosive of about 40 kt yield produced a chimney and associated fracture zone that traversed less than about 420 ft. of a total vertical span of the formation exceeding several thousand feet which contained producible natural gas.

In many instances where development of a resource by nuclear means appears to be feasible, the use of a single nuclear explosive of sufficiently large yield as to produce fractures which entirely traverse the resource bearing formation in the vertical direction would result in unacceptable damage due to the attendant seismic effects to structures such as buildings, dams, mines, etc. Also, the use of a single nuclear device of sufficient explosive yield as to provide the desired fracturing in the vertical direction may result in much more fracturing in the horizontal direction than can be effectively utilized in a particular application. Accordingly, there are many potential applications for the use of nuclear explosives where the development of the resource by a single large explosive is not feasible, or desirable, for one or more reasons.

The problems associated with the use of a single nuclear device to develop subterranean resources, which have been briefly outlined above, have been more fully described in U.S. Pat. No. 3,688,843 to Milo D. Nordyke, assignor to the United States of America as represented by the United States Atomic Energy Commission. That patent is directed to the utilization of a plurality of vertically spaced apart, preferably sequentially detonated nuclear explosives to circumvent those problems. The particular placement of the nuclear devices preferred by the Nordyke patent is one wherein there is an intersection of at least the fracture zones of the rubble chimney-fracture zone combinations created by the detonation of adjacent, vertically spaced apart devices thereby providing a vertically elongated generally cylindrical region of high permeability.

While creation of a vertically elongated generally cylindrical region of high permeability provides an effective approach to the development of particular resource reservoirs, it does not provide the most effective approach to the development of other reservoirs. Frequently the resource of interest is not uniformly distributed throughout a vertical interval of the formation but in a series of zones relatively rich in the resource separated by zones relatively lean or barren with respect to the resource. In those instances, creating a generally uniform fracturing pattern throughout the entire vertical interval, traversing productive and barren zones alike, would not provide a very efficient utilization of the total nuclear explosive energy expended.

In addition to being desirable for its own sake, the efficient utilization of the total nuclear explosive energy becomes critical in instances where for economic or other reasons simultaneous detonation of the nuclear explosives is necessary and there is a limitation on the total permissible explosive yield of such simultaneous detonation. Accordingly, it would be clearly advantageous to be able to exercise a greater degree of flexibility in the selection and emplacement of nuclear explosives as may be most applicable to the particular reservoir being developed.

Moreover, some uncertainty presently exists with regard to the precise distance fracturing will reliably occur above and below shot point. While the Nordyke patent places these distances at about 4.4 and 2.4 times the cavity radius, $R_c$, above and below shot point, respectively, analysis of data from Projects Gasbuggy and Rulison and from the Gnome, Ranier and Piledriver tests, reported in my paper entitled "Underground Effects of Nuclear Explosives," pp. 43-67, "Proceedings" American Nuclear Society Symposium on Engineering with Nuclear Explosives, Jan. 14-16, 1970, Las Vegas, Nev., indicates that sufficient permeability to assure interconnection of adjacent chimneys may not occur beyond 4.0 $R_c$ above and 2.0 $R_c$ below shot points. It would be unfortunate indeed if in any particular project spacing of the devices in accordance with the teachings of the Nordyke patent failed to achieve the necessary intersection of fracture zones. As a practical matter, the mere existence of that possibility will undoubtedly result in the spacing of adjacent shot points closer together than the maximum distance given in the Nordyke patent in the practice of the Nordyke method. While the Nordyke patent suggests the use of steel balls or drilling mud in the drill casing as a means to provide interconnection between chimneys, there is serious doubt that that suggestion would be practicable. It is most probable that the casing beneath the shot point will be completely sealed by the intense heat and/or shock produced by the nuclear explosive. It will be appreciated then, that a method which assures the interconnection of adjacent chimneys even though the adjacent shot points are at distances much greater than those taught in the Nordyke patent would be highly advantageous.

SUMMARY OF THE INVENTION

Accordingly, it is an object of the invention to provide a method involving the utilization of a plurality of vertically spaced apart nuclear detonations to develop a subterranean resource wherein flexibility in the yield and spacing of the detonations can be realized. Another object of the invention is a method utilizing a plurality of vertically spaced apart underground nuclear detonations wherein the effectiveness of the nuclear detonations on the development of an underground resource can be enhanced. An additional object of the invention is a method utilizing a plurality of vertically spaced apart nuclear detonations wherein adequate interconnection between the chimney and associated fracture zones of adjacent detonations can be assured.

Briefly summarized, the above and additional objects are accomplished by producing vertical fractures by nonnuclear means prior to the detonation of the vertically spaced apart nuclear devices in those intervals of the formation between adjacent nuclear shot points which will not, or may not, be fractured to any significant extent by the nuclear explosives. Adequate interconnection between vertically spaced apart chimneys and their associated fracture zones can be assured in this manner. This permits selection of the nuclear device yields and placement for optimizing the effect of the nuclear explosives on the development of the resource. This is of particular significance in natural gas stimulation projects since a single well-bore drilled back into communication with the fractures of the uppermost chimney will be in fluid flow communication with all of the vertically spaced apart chimneys. Additional objects and advantages and a better understanding of the invention will be apparent from consideration of the following description of a preferred embodiment thereof.

BRIEF DESCRIPTION OF THE DRAWING

The single FIGURE of the drawing illustrates the placement of a plurality of vertically spaced apart nuclear explosives and preparation of the formation in accordance with the invention.

DESCRIPTION OF PREFERRED EMBODIMENT

As shown in the drawing, three vertically spaced apart shot points 12, 14 and 16 are selected along well-bore 18 extending downwardly from the earth's surface 20 to that vertical interval of the formation containing the resource to be developed. The explosive yields of the nuclear explosives to be detonated at shot points 12, 14 and 16 are selected to produce the three chimneys 22, 24 and 26 of cavity radii $R_{c1}$, $R_{c2}$ and $R_{c3}$ as shown in phantom outline in the drawing.

The distances between shot points 12 and 14 and shot points 14 and 16 are such that there would be no significant interconnection between the fractures which will result from detonation of the nuclear explosives absent any pretreatment of the formation. In order to provide such interconnection, vertical fractures are produced in intervals 28 and 30 by nonnuclear means prior to the nuclear detonations.

The extent of the predetonation fracturing in intervals 28 and 30 must be sufficient to insure that they will be intersected by the fracture zones of the adjacent chimneys. Analysis of the data from Projects Gasbuggy, Rulison, Gnome, Ranier and Piledriver indicates that this can be accomplished with a very high level of assurance when the predetonation fracturing extends to within about 1.5 $R_{c1}$ below the upper shot point and within about 3.6 $R_{c2}$ above the lower shot point where $R_{c1}$ and $R_{c2}$ are the cavity radii of the chimneys that will be produced by the nuclear detonations at the respective shot points as calculated with the equation:

$$R_c = C(W/(\rho h)^\alpha )$$

Where:
C = A constant related to the rock medium's compactibility ($\sim$ 510 for gas stimulation shots in shale and sandstone).
$R_c$ = Cavity radius in ft
$W$ = Explosive energy in kilotons TNT equivalent
$\rho$ = Overburden density in g/cc
$h$ = Depth of burst in feet
$\alpha$ = Dependent upon the characteristics of the vaporized rock ($\sim$0.317 for gas stimulation shots in shale and sandstone).

It will be appreciated that any of a number of techniques can be employed to produce the vertical fractures in the interval between shot points. The technique which is preferred is to perforate the well-bore casing and inject fluid into the perforation until the rock formation breaks. The injection of a proppant into the fractures will be desirable in most instances. A number of fracturing points can be utilized if required by the particular situation.

After the fracturing of intervals 28 and 30 by nonnuclear means, nuclear explosives will be emplaced and detonated at shot points 12, 14 and 16, either simultaneously or sequentially as desired under the particular circumstances. The resultant permeable zone will extend vertically from the associated fractures above chimney 22 to the associated fractures below chimney 26. In the case of a natural gas stimulation project, a single well-bore will thereafter be drilled into chimney 22 to produce gas from all three chimneys.

The drawing illustrates a hypothetical case where three nuclear explosives are arranged in two series of two with predetonation fracturing utilized in each series. The number of nuclear explosives, the yield size of each, and the location of the shot points are interrelated variables that would be determined after analysis of all of the individual resource bearing zones occurring throughout that portion of the formation of interest. The extent of predetonation fracturing necessary between shot points, i.e., intervals 28 and 30 in the case illustrated on the drawing, would then be determined by the above formula. Intervals 28 and 30 would traverse zones of the formation which are barren, or relatively barren, with respect to the resource to be produced.

It will be appreciated that the optimum values for the above indicated variables will vary from location to location within the same reservoir basin and will be affected by factors such as whether the shots will be fired simultaneously or sequentially, the total yield of the shots to be fired and the increments of nuclear explosive yield size that are actually obtainable. There may be instances where development of a particular resource entails placement of two adjacent shots as close together as necessary to obtain intersection of the fracture zones. In such an instance it may be decided to place those two devices in accordance with the Nordyke teaching and omit predetonation fracturing therebetween. However, even where the placement of the nuclear explosives is such that predetonation fracturing would not appear to be necessary in accordance with the Nordyke teaching, the relative ease with which predetonation fracturing can be accomplished and the assurance that it can provide that interconnection of the fracture will in fact occur may dictate that it be done in that instance also.

While the fundamental novel features of the invention have been shown and described and pointed out as applied to particular embodiments by way of example, it will be appreciated by those skilled in the art that various ommissions, substitutions, and changes may be made within the principle and scope of the invention as expressed in the appended claims.

What I claim is:

1. A method of preparing a subterranean formation for the detonation of a plurality of nuclear explosives therein to facilitate the recovery of a natural resource therefrom comprising:

forming a vertical well-bore in the subterranean formation, selecting vertically spaced apart shot points along said bore for emplacing a plurality of pre-selected nuclear explosive devices, the distance between at least one series of two adjacent shot points being such that detonation of the pre-selected nuclear devices will not produce significant interconnected fracturing therebetween, and fracturing said formation along side of said well-bore by nonnuclear means prior to the detonation of said nuclear devices for an interval between said two shot points of said series, the position and extent of said interval being such as to be significantly intersected by the fractures produced by each of said two shot points upon detonation thereof.

2. The method of claim 1 wherein said interval starts at a distance of about $1.5 R_{c1}$, below the upper of said two shot points and ends at a distance of about $3.6 R_{c2}$ above the lower of said two shot points where $R_{c1}$ is the horizontal radius of the cavity that will be produced upon detonation of the pre-selected nuclear device at said upper shot point and $R_{c2}$ is the horizontal radius of the cavity that will be produced upon detonation of the pre-selected nuclear device at said lower shot point.

3. The method of claim 2 wherein said interval lies within a zone in said formation which is relatively barren with respect to the resource sought to be recovered.

4. The method of claim 2 wherein the selection of the yield of said nuclear devices for detonation at said upper and lower shot points, the position of said shot points and the extent of said interval is such that the cavities and their associated fracture zones produced by said detonations are within zones of the formation relatively rich with respect to the resource sought to be recovered and said interval traverses a zone of said formation relatively lean with respect to said resource.

5. The method of claim 4 wherein there is plurality of said series of two adjacent shot points with an interval therebetween.

6. The method of claim 2 wherein a plurality of nuclear devices including at least one of said series of two are to be detonated simultaneously, the total explosive yield of said device to be simultaneously detonated being fixed, the selection of the yields of said devices, the positions of their shot points and the extent of said interval being selected so that the cavities and their associated fracture zones produced by said simultaneous detonations are within zones of the formation relatively rich with respect to the resource sought to be recovered and said interval traverses a zone of said formation relatively lean with respect to said resource.

7. The method of claim 6 wherein there is a plurality of said series of two adjacent shot points with an interval therebetween.

* * * * *

UNITED STATES PATENT OFFICE
CERTIFICATE OF CORRECTION

Patent No. 3,814,185　　　　　　　　Dated June 4, 1974

Inventor(s) Charles Robert Boardman

It is certified that error appears in the above-identified patent and that said Letters Patent are hereby corrected as shown below:

Column 4, line 16, correct the equation to read: $R_c = C \dfrac{W^{1/3}}{(\rho h)^{\alpha}}$ Column 5, line 21, change "ommissions" to -omissions-.

Column 6, line 5, omit the number 9.

Signed and sealed this 15th day of October 1974.

(SEAL)
Attest:

McCOY M. GIBSON JR.　　　　　　　C. MARSHALL DANN
Attesting Officer　　　　　　　　Commissioner of Patents